United States Patent Office 3,453,354
Patented July 1, 1969

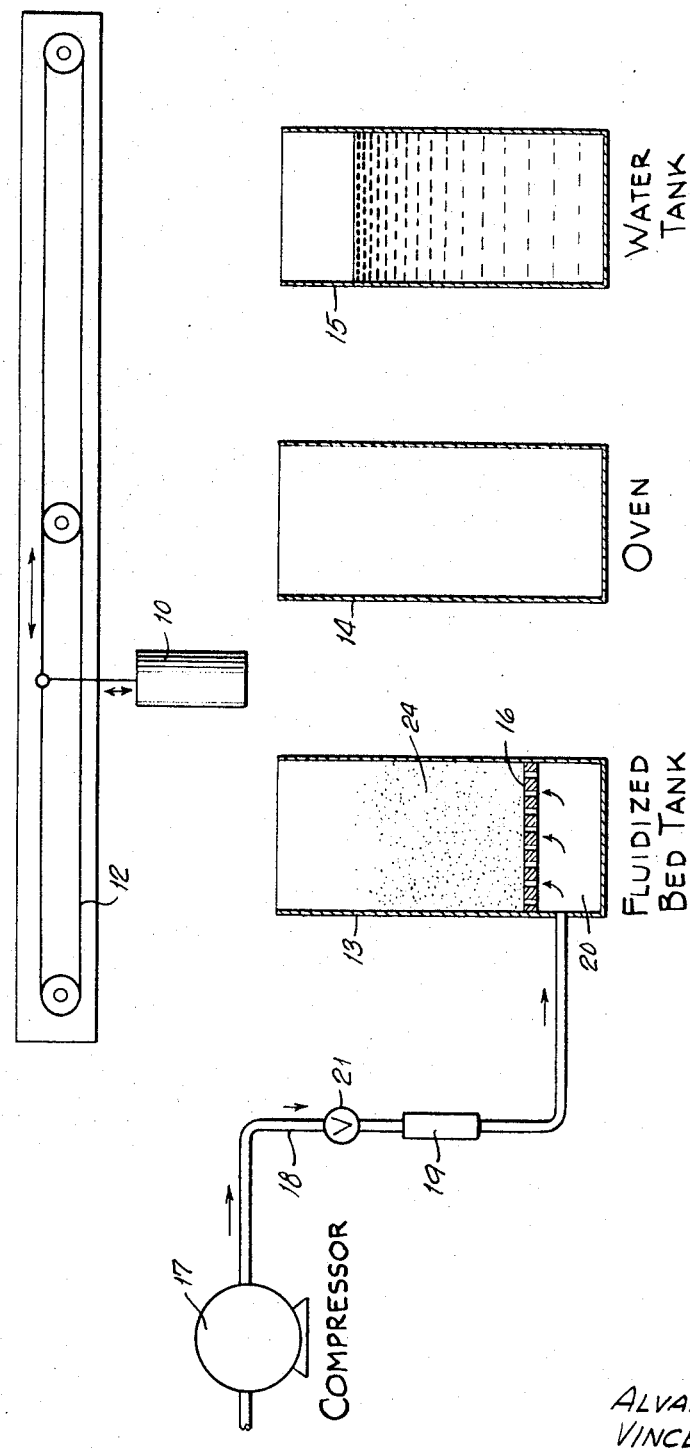

3,453,354
**METHODS OF MANUFACTURING
ION-EXCHANGE MEMBRANES**
Alvaro R. Tejeda, New York, N.Y., and Vincent G. Sarli,
Pompton Plains, N.J., assignors to Wallace & Tiernan
Inc., Belleville, N.J., a corporation of Delaware
Filed Dec. 27, 1965, Ser. No. 516,460
Int. Cl. D04h 1/16
U.S. Cl. 264—113        11 Claims

ABSTRACT OF THE DISCLOSURE

A method of making an ion-permeable membrane, suitable for use in forming a seamless tubular membrane, including the steps of establishing and maintaining a fluidized bed of a mixture of particles of thermoplastic polymeric material and particles of ion-exchange material; immersing at least once in the fluidized bed a mandrel having a surface to which the particles are capable of adhering, to establish on the surface a layer of the mixture of particles; heating the mandrel after each immersion in the fluidized bed to effect partial fusion of the thermoplastic polymeric material in the layer thereby to constitute the layer as a membrane; and immersing the membrane in water for arranging ion-exchange particles therein in continuous chains of contiguous particles extending between opposite sides of the membrane.

---

This invention relates to ion-permeable membranes. More particularly, it relates to heterogeneous ion-exchange membranes, especially so-called permselective membranes, and to methods of making the same. In one important aspect the invention specifically concerns methods of making seamless tubular permselective membranes.

Ion-exchange membranes which are selectively permeable to ions of one charge type (positive or negative) find application in a variety of electrolytic and especially electrodialytic operations. By way of illustration of the use and function of these permselective membranes, such a membrane may be employed to separate adjacent compartments of an electrodialysis cell through which direct current is passed for effecting selective transfer of ions between electrolytic solutions respectively contained in these compartments. The applied current causes ions, of the charge type to which the membrane is permeable, to migrate through the membrane from one compartment to the other, but countermigration of ions of opposite charge type (which would otherwise correspondingly occur under the influence of the applied current) is at least very substantially inhibited owing to the permselective character of the interposed membrane.

One effective form of electrodialysis cell employing permselective membranes, and having utility for demineralization of household or other water supplies, is disclosed in the co-pending application of Alvaro R. Tejeda, Ser. No. 434,824, filed Feb. 24, 1965, for Procedures and Apparatus for Electrodialytic Treatment of Liquids. This type of cell is of tubular configuration and is divided into a plurality of concentric annular chambers by tubular permselective membranes disposed concentrically therein and arranged so that adjacent membranes are respectively selectively permeable to cations and to anions, direct current being passed radially through these chambers between a central electrode and a circumferential electrode. Electrolytic solutions are conducted through the several chambers, of which some or all may be filled with packed beds of divided solid ion-exchange material to enhance electrical conductivity through the chambers. The tubular configuration is found to afford special advantages particularly with respect to efficiency and economy of operation.

Stated generally, a permselective membrane as used from the foregoing and other purposes comprises a sheet or film constituted of a polyelectrolyte and a matrix. The polyelectrolyte provides fixed, active (i.e. dissociable) charge sites, positive or negative, while the matrix affords mechanical stability for the membrane as necessitated by the structural weakness or brittleness of presently available polyelectrolyte materials. As will be understood, if the fixed charge sites are positive, the membrane is selectively permeable to anions, whereas a membrane having negative fixed charge sites is selectively permeable to cations. Desirable properties for such membranes include high permselectivity (i.e. high permeability for ions of one charge type together with low permeability for ions of opposite charge type), good electrical conductivity to minimize membrane resistance and consequent inefficient power consumption in electrodialysis apparatus, chemical and mechanical stability under the conditions encountered in use.

Permselective and other ion-exchange membranes are classified as homogeneous or heterogeneous depending on the nature of the distribution of the polyelectrolyte in the matrix. In a homogeneous membrane, the polyelectrolyte is intermingled with the matrix in the form of polymer chains. In heterogeneous membranes, to which the present invention particularly relates, the polyelectrolyte is dispersed in the form of discrete particles of ion-exchange material (e.g. particles of ion-exchange resin) through a polymeric matrix material. The individual ion-exchange particles in a heterogeneous membrane must be in contact with each other to afford the desired ion transfer and electrical conductivity across the membrane. Upon exposure to electrolytic solutions, these particles absorb electrolyte and swell. Sometimes a backing material of glass fiber or other fiber is employed in the membrane to prevent cracking or breaking of the membrane, since these membranes (without backing) are commonly characterized by brittleness and poor dimensional stability.

It may be explained that for provision of permselective properties in a membrane, the particles of ion-exchange material dispersed through the membrane are selected to provide fixed active charge sites of a single (positive or negative) charge type. Heterogeneous ion-exchange membranes of bipolar character may also be prepared using ion-exchange material (for example a mixture of cation-exchange and an ion-exchange resins) providing both positive and negative fixed charge sites.

Procedures for fabricating heterogeneous ion-exchange membranes heretofore known have generally involved either compression of one or both of the membrane constituents (ion-exchange material and matrix) as between rollers, to form a sheet, or dispersion of the ion-exchange particles in a solution of the matrix, followed by formation of a sheet and removal of the solvent therefrom by appropriate operations. While these procedures can afford permselective membranes suitable for many uses they are more or less costly and inconvenient, involving application of substantial mechanical force (as in the methods employing calendering of the membrane materials) or other troublesome steps such as solvent removal. Moreover, in the membranes produced by these described procedures, it is ordinarily necessary to provide a very high proportion of ion-exchange resin (e.g. 50% or more by weight) to afford adequate electrical conductivity through the membrane. Provision of membranes having a substantially lower proportion of ion-exchange resin, and a correspondingly higher proportion of matrix material, would be desirable for attainment of superior membrane mechanical strength.

It will further be appreciated that the known procedures for making ion-exchange membranes produce membranes which are in the form of flat sheets. For utilization of these membranes in a tubular electrodialysis cell as described above, it is necessary to bend the membranes into the desired tubular configuration and to join the opposed membrane edges at a seam. This seam constitutes a point of structural weakness in the tubular membrane, which may part when a substantial pressure differential exists across the membrane in use thereof in the tubular cell, especially when the pressure on the inner side of the membrane exceeds that on the outer side. Also, this seam constitutes a region of high resistance that distorts the radial electrical field in the tubular cell introducing a source of electrical inefficiency in the operation of the cell.

It is an object of the present invention to provide procedures for making heterogeneous ion-exchange membranes with advantageously superior economy, convenience and simplicity of operation. Another object is to provide a method of making ion-exchange membranes by which membranes of practicably high electrical conductivity are produced having a significantly lower proportion of ion-exchange material relative to proportion of matrix material used (and correspondingly higher mechanical stability) than membranes of comparable conductivity produced by methods heretofore known. Still another object is to provide procedures for making seamless tubular perselective membranes. A further object is to provide procedures for making reinforced ion-exchange membranes of very high mechanical stability, suitable for use where membranes of large surface area must be employed, in a simple and economical manner.

Yet another object of the invention is to provide ion-exchange memberanes having usefully high electrical conductivity and incorporating only a minor proportion of ion-exchange resin. A still further object is to provide ion-exchange membranes of superior mechanical strength. Another object is to provide new and improved seamless tubular permselective membranes.

To these and other ends, the method of the present invention broadly contemplates the steps of establishing and maintaining a fluidized bed of a mixture of particles of thermoplastic polymeric material and particles of ion-exchange material by passing a flow of gas through the mixture of particles; immersing, in the fluidized bed, a mandrel having a surface to which the particles are capable of adhering, to establish on the latter surface a coating of the mixture of particles from the fluidized bed; and heating the mandrel to effect at least partial fusion of the thermoplastic polymeric material in the coating.

In certain embodiments of the present method as hereinafter described the foregoing steps may be followed by subsequent operations to remove the coating from the mandrel as a nonreinforced permselective membrane, while in other embodiments the mandrel employed may be a screen or other open-mesh or perforate structure and may remain adhered to the coating of particles to provide structural support for the produced membrane. Also in accordance with the invention, in important specific aspects thereof, the produced membrane (whether separated from the mandrel, or supported thereby) is subjected to additional treatment for enhancement of its electrical conductivity and to produce the novel membrane product of the present invention.

As will be understood, in the foregoing method the thermoplastic polymeric material employed constitutes the matrix of the produced membrane, providing mechanical stability therefor, while the ion-exchange material is the active constituent of the membrane providing fixed charge sites of desired polarity. Examples of thermoplastic polymeric materials suitable for use as a matrix in the membrane of the present invention include polyethylene, polyvinylchloride (PVC), polypropylene, nylons (i.e. linear polyamides), "Penton" (chlorinated polyether thermoplastic polymer), polychlorotrifluoroethylene, methylmethacrylate, cellulose acetate butyrate, cellulose acetate, and ethyl cellulose. The material used should be solid at room temperature and preferably should have a second order transition temperature (this being the temperature when softening of the polymer begins to occur owing to movement of the polymeric chains) below the boiling point of water. Materials presently preferred for use as a matrix in the present method are polyvinylchloride, polyethylne and polypropylene, the latter two materials being especially preferred.

The active material used may broadly be any water-insoluble ion-exchange material and may be as produced by any of a variety of methods. For example, the material used may be produced either by polycondensation reactions or polyaddition reactions. Procedures for producing either cation-exchange or anion-exchange materials as by one of the foregoing types of reactions are well known in the art and accordingly need not be described in detail. In particular, it is convenient to employ as the ion-exchange material in the present method an infusible ion-exchange resin, e.g. commercially available types of cross-linked resins. An advantage of using an infusible resin is that such resins are almost invariably water-insoluble so that there is no tendency of the material in the resulting membrane to leach out during use in exposure to aqueous electrolytes.

Examples of cation-exchange resins suitable for use in the method of the invention include Ionac C–240 cation nuclear sulfonic strong acid resin, commercially available from Ionac Chemical Company; phenolic resins containing methylene sulfonic strong acid groups such as the resins C–3 and C–10 manufactured by Chemical Process Company and Zeo-Karb manufactured by the Permutit Compnay; polystyrene resins containing nuclear sulfonic strong acid groups such as resins C–20, C–20X10, C–20X12 and C–25 manufactured by Chemical Process Company, resins 50, 50–X10 and 50–X12 manufactured by Dow Chemical Company, resin C–240 manufactured by Ionac Chemical Company and resins IR–120, IR–122 and IR–124 manufactured by Rohm & Haas Company; acrylic resins containing carboxylic groups, e.g. Amberlite IRC–50 manufactured by Rohm & Haas Company and Zero-Karb 226 manufactured by Permutit Company; and resins containing phosphonous acid, phosphonic acid and phosphoric acid groups such as resins ES–62, ES–63 and ES–65 manufactured by Chemical Process Company. Examples of suitable anion-exchange resins include Ionac A–540 anion quaternary ammonium strong base resin, commercially available from Ionac Chemical Company; styrene resins containing quaternary ammonium strong base groups, e.g. Amberlite IRA–400, IRA–401 and IRA–410 manufactured by Rohm & Haas Company, Dowex 1 (Nalcite SBR) and Dowex 2 (Nalcite SAR) manufactured by Dow Chemical Company, Duolite A–101 and A–102 manufactured by Chemical Process Company, and Permutit S–1, S–2 and FF resins manufactured by Permutit Company; styrene resins containing weak base groups, e.g. Amberlite IR–45 manufactured by Rohm & Haas Company and Dowex 3 manufactured by Dow Chemical Company; phenolic resins containing weak base groups (secondary and tertiary amine), e.g. Amberlite IR–4B manufactured by Rohm & Haas Company, and Duolite A–114, Duolite A–4 and Duolite A–7 resins manufactured by Chemical Process Company. The numerical type designations of resins mentioned above are as understood from information heretofore available in the industry.

In the practice of the present method, both the thermoplastic matrix material and the ion-exchange material are used in finely divided (i.e. powdered) form, and are mixed together to provide a powdered mixture preferably containing between about 15% and about 30% by weight ion-exchange material, mixture containing about 20% by weight ion-exchange material being presently especially preferred for many applications. For production of a permselective membrane, the ion-exchange material used preferably consists either of cation-exchange resin (to provide a cation-permselective membrane) or of anion-exchange resin (to provide an anion-permselective membrane). For production of bipolar membranes, a mixture of both anion- and cation-exchange materials may be utilized. The matrix material may comprise either one or a mixture of thermoplastic polymeric materials. The mixture of ion-exchange and matrix particles is introduced to a fluidized bed tank, e.g. of generally conventional type, which provides a laterally confined chamber having a perforate plate extending across its lower extremity. An upwardly directed flow of gas, conveniently air from a compressed air supply, is introduced to the chamber through the perforate plate, this gas flow being provided and maintained at such rate as to effect and maintain fluidization of the body of particles contained in the chamber, i.e. to provide a fluidized bed of the particles. It will be understood that reference to fluidized condition of the particles herein means that condition in which the particles, elevated and agitated in the flow of gas, exhibit the appearance as well as certain characteristic properties of a boiling liquid. In the fluidized bed it is found that the ion-exchange particles and the particles of thermoplastic matrix material are quite uniformly intermixed.

In accordance with certain embodiments of the method of the invention, a metal mandrel is preheated, as in an oven, to a temperature at which sintering of the thermoplastic particles of the fluidized mixture will occur. The mandrel may be of any appropriate shape to produce a membrane of desired configuration; for example, to produce a flat membrane the mandrel may be a flat metal sheet. However, in an important specific aspect the invention contemplates utilizing a mandrel of tubular (e.g. cylindrical) configuration for production of a seamless tubular membrane. The mandrel outer surface (of whatever configuration) may conveniently be precoated with a conventional mold release material such as a silicon mold release agent. When a hollow tubular mandrel is used, conveniently the tube is closed at the ends so that the membrane is formed on the outer mandrel surface, although if desired the tube may be left open which results in formation of a membrane on the inner mandrel surface as well.

The heated metal mandrel (herein described for purposes of illustration as an elongated cylindrical tubular mandrel) is immersed, preferably in axially vertical position, in the fluidized bed. Upon contact with the heated metal surface, particles of the thermoplastic matrix material and ion-exchange material from the fluidized bed adhere to the outer surface of the mandrel (and to each other on the surface) in the uniformly intermixed relation provided by the fluidized bed, to build up on the mandrel surface a coating of the mixture of particles. These particles are mutually adherent owing to the sintering of the thermoplastic matrix particles produced by the heat of the mandrel. Thickness of this coating is determined by the temperature of the mandrel and by the time of immersion which may ordinarily be of the order of several seconds.

Following the establishment of this coating, the mandrel is withdrawn from the fluidized bed and heated, as in an oven, to cure the coating. Specifically, the time and temperature of the heating step are selected to effect at least partial fusion of the thermoplastic matrix particles and thereby to constitute the coating as a continuous closed membrane structure without open pores. It is, however, greatly preferred to heat the coating in the curing step to a point short of complete fusion of the thermoplastic matrix, i.e. to effect only partial fusion of the matrix particles. In the preparation of cation-permselective membranes, utilizing a fluidized mixture of cation-exchange resin particles and particles of thermoplastic matrix material e.g. such as polyethylene, polypropylene or polyvinyl chloride, the mandrel may be heated during the curing period to a temperature of between about 400° C. and about 500° C. For preparation of anion-permselective membranes, using an anion-exchange resin as the polyelectrolyte material, the mandrel is preferably heated in the curing step to a maximum temperature of not more than about 400° C., as most commercially available anion-exchange resins are heat-sensitive and decompose at temperatures above the latter value. Accordingly, in the production of anion-permselective membranes by the present method it is convenient to use a vinyl matrix material, owing to the relatively low melting point and low viscosity of such material, or (if a material such as polyethylene is used) to employ a proportion of ion-exchange resin in the lower portion of the aforementioned preferred range, i.e. a proportion below 25% by weight.

To build up a thicker coating on the mandrel surface that is readily obtainable by a single immersion in the fluidized bed, the mandrel may, after withdrawal from the bed and reheating in the curing step, be reimmersed in the bed to pick up further particles; this procedure may be repeated several times (with a curing and reheating step after each immersion) as necessary to produce the desired thickness of coating. Preferably, and especially when an elongated mandrel is used, the mandrel is inverted prior to each successive immersion in the fluidized bed so that opposite ends of the mandrel project downwardly into the bed in successive immersions to insure uniformity of coating over the mandrel surface. Following the last immersion the mandrel bearing the coating is once again placed in the oven for a final curing step. In the described procedure including successive immersions of the mandrel in the fluidized bed, each heating of the mandrel (after the initial preheating) serves to cure the coating thus far applied thereon, these heating steps being conducted under the curing conditions set forth above, i.e. to heat the coating sufficiently to effect fusion of the thermoplastic matrix particles, but very preferably to a point short of complete fusion of the matrix.

Subsequent to the curing of the mandrel coating, the mandrel is immersed in water to effect removal of the coating therefrom. The water cools the mandrel and thus causes it to contract while simultaneously causing swelling of the water-absorbent coating, with the result that the coating slips easily off the mandrel. If desired, to shorten the time required for removal of the coating, the water may be at elevated temperature, e.g. boiling water. The removed coating constitutes a permselective membrane, and (in the case of use of a tubular mandrel) is in the form of a continuous, i.e. seamless, tube; it may have a thickness, for example, of the order of several tens of mils, established by several successive immersions of the mandrel in the fluidized bed as described above.

Further in accordance with the invention, the thus-produced membrane is treated to increase its electrical conductivity. Preferably, such treatment comprises immersion of the membrane in water, at a water temperature above the second order transition temperature of the matrix membrane material, and preferably at a water temperature substantially elevated above room temperature. Stated generally, the immersion time required to effect a desired increase in conductivity is dependent on the temperature of the water, and decreases with increasing water temperature. Thus, if the soaking is performed at room temperature, an immersion time of as much as two months or longer may be necessary to achieve satisfactory membrane conductivity, whereas at a water temperature in a range between about 80° C. and 100° C., desired membrane conductivity may be attained with soaking periods as short as about one-half hour to one hour. Accordingly, immersion of the membrane in water at a temperature in the latter range is presently especially preferred.

By way of specific example, the membrane may conveniently be immersed in boiling water (i.e. water at 100° C. at normal atmospheric pressure) e.g. for a period of at least about one hour. The enhancement of conductivity achieved by this boiling step, in illustrative examples of cation-permselective membranes prepared in accordance with the present invention, is shown in the following table:

| Boiling time (min.) | Areal resistance (ohms×cm.²) | Conductivity (mho cm.⁻¹) |
| --- | --- | --- |
| Unboiled | Over 10,000 | 0 |
| 20 | 294 | $0.38 \times 10^{-3}$ |
| 40 | 144 | $0.78 \times 10^{-3}$ |
| 120 | 133 | $0.85 \times 10^{-3}$ |

In these tests, the membrane samples used were 44 mils thick and the measurements of conductivity were made in a cell with the membrane in equilibrium with 0.1 N KCl solution.

Similar results can be achieved by water treatment at water temperatures in the lower part of the preferred range, e.g. 80°–90° C. This practice is convenient when the polymeric matrix, as with some vinyls, tends to soften excessively at 100° C. so that a lower temperature should be employed.

The improvement in conductivity thus attained with immersion in water is presently believed attributable to two concomitant actions or effects of the immersion step in modifying the physical condition of the membrane as released from the mandrel. In the first place, it is found that a thin continuous layer of completely fused matrix material is formed, during the coating and curing steps, on the inner surface of the membrane, i.e. that surface which is in contact with the mandrel. This layer (believed to be constituted of a low melting point fraction of the matrix material) prevents exposure of the ion-exchange resin particles at the inner surface and has an insulating effect that very geratly reduces the conductivity of the membrane. Immersion of the membrane in water under the above-described conditions removes or alters this layer and exposes ion-exchange resin particles at the inner surface; the immersion is also found to increase the proportion of ion-exchange resin particles exposed at the outer surface of the membrane.

Thus, in the case of a typical membrane produced by the present method, constituted of a mixture of black polyethylene and a cation-exchange resin, and boiled in water (at 100° C.), the inner surface of the membrane before boiling exhibited a shiny black appearance, and on microscopic examination the inner membrane area was found to contain about 2% exposed ion-exchange particles embedded in the surface. The outer surface of the membrane had a black-gray appearance and contained about 60% exposed ion-exchange particles. After boiling, the inner membrane surface contained more than 75% exposed ion-exchange particles and the outer surface contained more than 90% ion-exchange particles.

In addition to removing the insulating inner layer of the membrane, the water-immersion step, in combination with the membrane-forming and curing steps, has another further conductivity-enhancing effect which, while not presently fully understood, nevertheless evidently contributes very significantly to attainment of the superior conductive properties of the produced membranes. As a possible theoretical explanation (to which, however, the invention is in no sense limited), it is presently thought that this second effect believed to be produced by the immersion may involve a rearrangement of the ion-exchange particles within the membrane into chains of contiguous particles of ion-exchange resin extending across the membrane to provide conductive paths therethrough. In this connection, it may be explained that the cured membrane produced by the foregoing procedure (before the immersion treatment) is believed to contain minute air bubbles or voids, and the ion-exchange resin particles are thought to be largely encapsulated, i.e. not in contact with each other as necessary for desired membrane conductivity. After the water-immersion step, it is presently believed that the air bubbles are no longer present, and that the ion-exchange resin particles are disposed in continuous conductive arrays or chains of contiguous particles extending between opposite surfaces of the membrane. It is believed that the air voids are produced by the particular above-described steps of membrane fabrication, viz. deposition of particles from a fluidized bed followed by partial fusion of the matrix material, and that these air voids are caused to collapse by the immersion step (the air being driven off). It is further believed that the rearrangement of the ion-exchange particles providing enhanced membrane conductivity occurs as a result of the collapse of the air voids, and may also be due in part to the swelling of the ion-exchange particles by absorption of water, during immersion.

Attainment of this effect of the immersion step is presently understood to require that the temperature of the membrane and water in the immersion step be above the second order transition temperature of the included matrix material and it is for this reason that use of a matrix material having a second order transition temperature below 100° C. is preferred, although in the case of matrix materials having a higher second order transition temperature the immersion step may be performed under conditions of elevated pressure to provide the requisite higher boiling temperature. The presently preferred matrix materials mentioned above all have second order transition temperatures far below 100° C.

While the immersion step has been described above as involving soaking of the membrane, after removal from the mandrel, in a body of water, in a broader sense this step of the present method embraces various modifications of such procedure. For example, the liquid in which the membrane is immersed may be an aqueous electrolytic solution, e.g. a solution of potassium chloride. Alternatively, the membrane may be exposed to saturated water vapor, for instance at elevated temperature, or even to superheated steam. Indeed, some improvement in conductivity may be effected during the aforementioned initial immersion of the membrane in water, performed for the purpose of separating it from the mandrel; but to achieve removal of the non-conductive membrane surface layer formed adjacent the mandrel the membrane should be further immersed after separation from the mandrel, i.e. to ensure that the latter layer is adequately exposed to the water.

By the foregoing procedure, including the terminal boiling or soaking step, there may be produced a permselective membrane (selectively permeable to anions or cations depending on whether an anion-exchange resin or a cation-exchange resin is used) having an ion-exchange resin content of between about 15 percent and about 30 percent by weight, yet having conductivity sufficiently high to enable effective use of the membrane in electrodialysis cells. As stated above, it is presently believed that the high conductivity of these membranes having a low content of ion-exchange resin may be due to the particular orientation of the ion-exchange resin particles achieved by the succession of steps of forming the membrane from a fluidized bed (producing air voids in the membrane) and immersing the membrane in water to drive off the air and thereby reorient the active particles. Heating of the membrane in the curing step to a point short of complete fusion is therefore considered important for the attainment of these results, because if the matrix material were completely fused there would be no included air voids and hence the immersion step could not effect the desired arrangement of active particles.

The product of the present invention is thus a membrane, produced by the above-described procedure, constituted of ion-exchange particles and thermoplastic polymeric matrix material, with an ion-exchange resin content between about 15 percent and 30 percent by weight (and preferably about 20 percent). The conductivity of these membranes is generally at least about $0.5 \times 10^{-3}$ mho cm.$^{-1}$, somewhat higher conductivity (e.g. at least about $0.8 \times 10^{-3}$ mho cm.$^{-1}$) being attained in cation-permselective membranes than in anion-permselective membranes, and even higher conductivities (e.g. $1.0 \times 10^{-3}$ mho cm.$^{-1}$ or above) being commonly achieved.

That is to say, the membranes of the present invention have conductivities heretofore attainable only in membranes having a significantly higher proportion of ion-exchange resin, and a correspondingly lower proportion of matrix material. The described membranes are accordingly characterized by markedly superior mechanical strength (owing to the higher proportion of matrix material included) as compared to previously known heterogeneous membranes of equivalent conductivity. In particular, the mechanical strength of the present membranes is such that they may be used without reinforcement or backing, or special care in handling or mounting, as necessary in the case of the previously-known membranes. Moreover, the present membranes do not crack or break upon drying, whereas membranes of like conductivity heretofore known must be kept wet to prevent cracking, because of their larger proportionate content of ion-exchange resin, which undergoes crack-producing dimensional change as it dries. The present membranes are also characterized by excellent permselectivity.

In addition to providing a membrane having these properties, the present method has the further advantages of superior convenience and economy of membrane fabrication, avoiding the necessity for the use of high pressures or operations such as solvent recovery heretofore associated with membrane manufacture, and great versatility both as to membrane shape and composition. When a cylindrical or tubular mandrel is used as described above, the method enables production of a seamless tubular membrane having desirably improved structural strength and appropriate properties for use in tubular electrodialytic cells as described in the aforementioned co-pending application of Alvaro R. Tejeda. As already stated, membranes of other configurations may readily be produced by the present method by using a mandrel of the desired shape. Similarly, membranes having a wide variety of compositions can be produced in this manner; in addition to permselective membranes, bipolar ion-permeable membranes can be made, e.g. by using as the ion-exchange material a mixture of anion-exchange and cation-exchange resin particles.

The described method may further be understood by reference to the accompanying drawing, which illustrates diagrammatically a system arranged for the practice of the present method.

Referring to the drawing, there is shown a metal mandrel 10 suspended from a rail pulley system 12 which is adapted to effect travel of the mandrel between a fluidized bed tank 13, an oven 14 and a water tank 15. In the fluidized bed tank, there is placed a mixture of thermoplastic polymeric matrix material particles and infusible ion-exchange resin particles, this mixture resting on a perforate plate 16. A flow of gas, for example air from a compressor 17, is advanced through a conduit 18 (where it may be metered as by a rotameter 19) into the space 20 below the perforate plate 16. A valve 21 in line 18 serves to regulate the rate of gas flow. The gas flows upwardly from the space 20 through the perforate plate and through the mixture of particles in chamber 24 above the plate, effecting fluidization of the mixture of particles.

The mandrel 10 is preheated in the oven 14 to the desired temperature and then transported to the fluidized bed tank where it is immersed in the fluidized particulate mixture to establish a layer of particles from the bed on the mandrel surface. In the fluidized bed tank, the particles adhere to the mandrel wall, making a continuous film covering the mandrel surface to a thickness determined by the mandrel temperature and immersion time in the fluidized bed. The matrix material particles and ion-exchange material particles are uniformly distributed in this layer.

After formation of the layer, the mandrel bearing the same is returned to the oven 14 for curing, and may be subjected to a plurality of successive immersion and curing steps to build up a coating layer of desired thickness. Following the final curing step, the mandrel is air cooled, e.g. to about 250° F. and transferred to the water tank for quenching. The mandrel is left in contact with the water for a period of time sufficient to cause the coating layer to swell (owing to the water absorbent properties of the ion-exchange material embedded in the layer) and thereby to become disengaged from the mandrel. The disengaged membrane may then be removed from the water tank as for subjection to the aforementioned water-immersion operation.

While the method of the invention has been described above as including the step of releasing the membrane from the mandrel after formation and curing are complete, alternatively the membrane may be formed on a perforate or open-mesh metal mandrel (for example constituted of wire screen) the coating being formed on both sides and extending through the openings of such mandrel so as to remain in adherent relation on the mandrel which then serves as a structural supporting element for the membrane. Stated generally, the metal screen or other perforate mandrel may be of any suitable metal (for example such as stainless steel, brass, or Monel metal), and is preferably precoated with some inert material such as silicon varnish, Teflon, polyethylene, or vinyl to protect the metal from corrosion or electrochemical attack upon exposure of the membrane to electric current and conductive electrolytic solutions in an electrodialysis cell. When desired to produce a tubular membrane, the metal screen may be bent into tubular shape.

In these embodiments of the method, coating of the mandrel is effected by immersion in a fluidized bed of ion-exchange resin particles and matrix particles followed by heat-curing, as in the procedures already described. The mandrel may be preheated before immersion in the fluidized bed, but when a very thin perforate metal structure is used it is in some cases preferable to wet the mandrel surface (e.g. with water or a water-soluble compound) rather than heating it. The reason for this is that in such thin structure heat may be dissipated too rapidly to enable convenient immersion of the mandrel in the fluidized bed while it is still hot enough to effect sintering of the matrix particles. The wetting of the mandrel in such case provides a surface to which the particles of the fluidized bed can adhere. When the first adherent layer of particles has been formed, the mandrel may be heated and reimmersed in the fluidized bed for a succession of coatings without further wetting, since the particles will adhere to the already-formed layer which has a softened or partially melted surface after heating.

A succession of immersions in the fluidized bed is usually necessary to establish on the perforate mandrel surface a continuous coating of matrix and ion-exchange particles that completely bridges all openings in the supporting mandrel. Curing and quenching of the coated perforate mandrel are accomplished in the same manner as in the case of an imperforate mandrel, but the perforate mandrel is not separated from the membrane, serving instead as a permanent structural support or reinforcement therefor.

It will be appreciated that since the perforate mandrel remains embedded in the cured membrane, the membrane has no such insulating layer as is encountered on the inner surface of a nonreinforced membrane after removal from an imperforate mandrel. Nevertheless, it is still preferred to follow the curing operation with a water-immersion step, since this is found to enhance the conductivity of the membrane very significantly notwithstanding the absence of such insulating layer. Again as a possible explanation of this observed result, it is believed that the improved conductivity thus obtained may be due to the collapse of air voids established in the fluidized bed step and the consequent rearrangement of the ion-exchange material into continuous chains of contiguous particles.

The method of the invention in its last-described embodiments has particular advantages in affording facile and economical production of membranes having high mechanical and dimensional stability. These properties are imparted to the membrane by the perforate reinforcing structure, and enable production of membranes of very large size, or membranes for use in operations involving exposure to exceptionally high pressure differentials, e.g. water pressures of as much as 100 p.s.i. or more even in the case of a flat membrane; tubular reinforced membranes can withstand even higher internal water pressures.

With respect to the improvement in dimensional stability afforded by the provision of a perforate or meshwork metal support, it may be explained that non-reinforced membranes undergo substantial dimensional change when exposed to water owing to the water-absorbing properties of the included ion-exchange material. Thus, for example, a typical non-reinforced polyethylene-cation resin membrane undergoes a linear expansion of $3.9\% \pm 0.6\%$ and a thickness expansion of $7.6\% \pm 1.6\%$ when immersed in an electrolyte, while a typical non-reinforced anion exchange resin-vinyl membrane exhibits a linear expansion of $6.66\% \pm 0.42\%$ and a thickness expansion of $7.22\% \pm 1.77\%$. These dimensional variations sometimes present difficulties in cell design and construction. Provision of a reinforcing structure for the membrane effectively prevents significant dimensional change of the membrane when it is immersed.

Membranes having meshwork or perforated reinforcing structures of material other than metal may also be produced in accordance with the present invention. For example, a glass fiber screen may be placed against a metal mandrel and, after preheating, immersed with the mandrel in the fluidized bed of particles for establishment of a coating on the glass screen. After completion of the desired succession of immersion and curing steps, the coated glass screen may be removed from the metal mandrel to constitute a glass fiber-supported membrane. Alternatively, a glass fiber screen may be wrapped around a tubular metal support and heated sufficiently to form a "green glass tube" which is welded together and exhibits substantial dimensional stability. This glass tube, removed from the metal support, may then be used as the mandrel for performing the present method, being wetted before the first immersion in the fluidized bed to enable adherence of the particles to the screen.

The present invention further embraces the fabrication of conductive electrdialysis separator screens, i.e. openwork screens for mechanically separating beds of ion-exchange resin in an electrodialysis cell. To form such a separator, a metal or like screen is coated by immersion in a fluidized bed of ion-exchange material and matrix material followed by curing, but the duration and number of immersions are selected so that only the wire of the screen is coated and the holes are not bridged. These steps may be followed as before by immersing the coated screen in water to enhance the coating conductivity. The resultant screen is an open mesh structure permitting free flow of electrolyte; but by virtue of the presence of ion-exchange material in the coating, the screen is conductive and, therefore, does not create an electrical "shadow" in an electrodialysis cell such as is produced when a non-conductive separator structure is used.

In the fabrication of a separator as described above, cation-exchange material or anion-exchange material may be used alone. However, for many applications it is preferable to use a mixture of anion-exchange and cation-exchange resins as the ion-exchange material in the fluidized bed, to produce a screen having a conductive coating which is bipolar in character.

By way of further and more specific illustration of the method and products of the present invention, reference may be had to the following specific examples, wherein all proportions of materials are expressed by weight.

EXAMPLE I

A cylindrical brass tube three inches in outside diameter and 23¾ inches long, having a wall thickness of 0.049 inch, was coated on its outer surface with a silicon mold release agent and preheated in an oven to a temperature of 480° F. The heated mandrel was then immersed for five seconds in a fluidized bed tank containing a fluidized mixture of particles, of which 25% were a micro powder cation-exchange resin and 75% were a micro powder black polyethylene, to coat the outer surface of the mandrel. The cation-exchange resin was XE–69 resin manufactured by Rohm & Haas Co., this resin also being designated IR-120. The polyethylene powder used was PCA-32-black-1 powder manufactured by Polymer Corporation. A continuous flow of compressed air was passed upward through the bed at a rate of 11.5 cu. ft./min. to maintain the bed in fluidized condition, the height of the fluidized bed being 29". After the first coat was applied, the coated mandrel was reheated for 187 seconds up to a mandrel metal wall temperature of 475° F. Three more coats were applied in indentical manner, with a heating stage following each immersion, until a coating layer about 40 mils thick was obtained. After the final curing step, the coated mandrel was air cooled to 200° F. and quenched in water for two minutes. The mandrel was then immersed in water overnight, and owing to the swelling of the coating, it became disengaged from the mandrel as a seamless tubular permselective membrane 18 inches long. This membrane was boiled for one hour in water.

Samples 2½" x 2½" cut from the tubular membrane after boiling were equilibrated for 24 hours in an 0.1 N KCl aqueous solution. The properties of these samples were then measured and found to be as follows: Specific electrolytic conductivity (in 0.1 N KCl solution), $0.82 \times 10^{-3}$ mho cm.$^{-1}$ at 25° C.; transport number (a measure of the permselectivity of the membrane, measured in a cell having the membrane disposed between a 1.0 N KCl solution and an 0.5 N KCl solution), 90.0%; wet thickness 44 mils.

The remainder of the tubular membrane, as also other tubular membranes fabricated under identical conditions, were subjected to an internal pressure of 15 p.s.i.g. to test the membrane for pinholes or weak spots. None of these membranes exhibited leakage when the outside surface was kept dry. When the outside surface was wet a small amount of water was observed to permeate through the membrane walls, but this effect was eliminated almost completely when the pressure differential across the membrane was reduced to a practical minimum.

EXAMPLE II

Following the procedure described in Example I, a series of membranes were prepared from a fluidized bed containing one part XE–69 cation-exchange resin particles to four parts of VCB-1325-clear-2084 polyvinyl chloride powder manufactured by Polymer Corporation. The mandrel used was a brass tube having the same diameter and wall thickness as in Example I but 11½ inches long, coated with a silicon mold-release agent. Membranes produced by 2, 3, and 4 immersions were prepared. In each case, the oven temperature used for preheating the mandrel was 500° F., the reheating temperature (for curing following each immersion) was 400° F., the immersion time for each coat was five seconds and the terminal boiling period was one hour.

The physical properties of these membranes (after boiling) were found to be as follows:

| No. of coats | Thickness (mils) | Conductivity, mho cm.$^{-1}$ (0.1 N KCl) |
|---|---|---|
| 2 | 20 | 1.6×10$^{-}$ |
| 3 | 30 | 1.5×10$^{-}$ |
| 4 | 40 | 1.3×10$^{-}$ |

The permselectivity of the 40 mil thick membrane was then determined in a cell having a first aqueous KCl solution on one side (designated side A) of the membrane and a second aqueous KCl solution, of different concentration, on the other side (side B) of the membrane. Values of transport number determined for various KCl concentrations on sides A and B were as follows:

| Concentration (side A) (N) | Concentration (side B) (N) | Transport number, percent |
|---|---|---|
| 1.0 | 0.5 | 85.6 |
| 1.0 | 0.1 | 91.4 |
| 1.0 | 0.01 | 95.2 |
| 0.5 | 0.25 | 90.9 |
| 0.5 | 0.1 | 92.6 |
| 0.5 | 0.01 | 98.3 |
| 0.25 | 0.1 | 94.5 |
| 0.25 | 0.01 | 98.2 |
| 0.1 | 0.05 | 97.5 |
| 0.1 | 0.02 | 98.4 |
| 0.1 | 0.01 | 99.2 |
| 0.05 | 0.02 | 90.1 |
| 0.05 | 0.01 | 99.3 |

EXAMPLE III

Using a tubular brass mandrel of the same dimensions as in Example II, coated with silicon mold release agent, a polyethylene matrix anion permselective tubular membrane was prepared. The mandrel was preheated to a temperature of 400° F. and immersed for 10 seconds in a fluidized bed containing a mixture of 16.7% micro powder anion-exchange resin (resin XE–67 manufactured by Rohm & Haas Company) and 83.8% PCA-32-black-1 micropowder black polyethylene. The height of the fluidized bed was maintained at 10 inches. After the first coat was applied, the mandrel was reheated to a surface temperature of 388° F. Three more coats were then applied under identical conditions, with reheating after each immersion, to produce a continuous coating layer 40 mils thick on the outer surface of the mandrel. After the final heating step, the membrane was air cooled to 300° F. and quenched in water for two minutes. The membrane was released from the mandrel by soaking in water and thereafter boiled for two hours.

A sample of the membrane before boiling was found to have a conductivity of 0.15×10$^{-4}$ mho cm.$^{-1}$ and a transport number of 83.6%. The boiled membrane had conductivity of 0.92×10$^{-4}$ mho cm.$^{-1}$ and a transport number of 92.2%. The conductivity was measured in an 0.1 N KCl aqueous solution and the transport number was determined in a cell having the membrane interposed between an 0.5 N KCl solution and a 1.0 N KCl solution.

The conductivity and transport number of the boiled membrane were then measured at various KCl solution concentrations as indicated in the following tables.

Conductivity vs. concentration

| KCl conc., N: | Conductivity, mho cm.$^{-1}$ |
|---|---|
| 0.1 | 0.92×10$^{-4}$ |
| 1.0 | 0.23×10$^{-3}$ |
| 2.0 | 0.35×10$^{-3}$ |
| 3.0 | 0.45×10$^{-3}$ |

PERMSELECTIVITY VS. CONCENTRATION

[Measured in the chain: side A (KCl)/membrane/side B (KCl)]

| KCl Conc. (side A) (N) | KCl Conc. (side B) (N) | Transfer number, percent |
|---|---|---|
| 1.0 | 0.5 | 93.0 |
| 2.0 | 0.5 | 87.0 |
| 3.0 | 0.5 | 84.0 |
| 1.0 | 0.1 | 95.0 |
| 2.0 | 0.1 | 92.0 |
| 3.0 | 0.1 | 90.0 |

It will be noted from the foregoing data, that the produced membrane retained high permselectivity even at concentrations up to 3.0 N KSl which is near the saturation point of posassium chloride solutions at room temperature.

EXAMPLE IV

A cylindrical brass tubular mandrel 6 inches in outside diameter and 24 inches long having a 1/16 inch thick wall was coated with a mold-release agent and preheated to a temperature of 400° F. The heated mandrel was then immersed for five seconds in a fluidized bed containing 20% XE–67 anion-exchange resin powder and 80% VCB-1325-clear-2084 polyvinyl chloride powder. After the first immersion the mandrel was reheated to a wall temperature of 400° F., and three more coats were applied, with reheating after each immersion, to produce a coating layer 40 mils thick. The coated mandrel was then air-cooled to 200° F. and quenched in water for two minutes. The tubular anion permselective membrane was then released from the mandrel by soaking in water, and boiled for a one-hour period.

The conductivity of the boiled membrane in 0.1 N KCl solution was found as 0.53×10$^{-3}$ mho cm.$^{-1}$ and the transport number, determined in the same manner as in the preceding example, was 89.3%.

EXAMPLE V

Another anion-permselective membrane was produced from a fluidized bed containing 56% VCB-1325-clear-2084 polyvinyl chloride powder, 24% PCA-32-black-1 polyethylene powder, and 20% XE–67 anion-exchange resin powder, by immersion of a metal mandrel therein. In this example, the height of the fluidized bed was 11 inches. The mandrel was preheated to 400° F. before the first immersion, and immersed in the bed for 4 five-second periods, being reheated after each immersion to 400° F. Following the final heating step the mandrel was cooled in air to 200° F. and quenched in water for two minutes. The produced membrane, released from the mandrel by soaking in water, was boiled for one hour. An average of 18 measurements taken with different samples of membrane after boiling showed a conductivity of 0.97×10$^{-3}$ mho cm.$^{-1}$ in 0.1 N KCl solution.

Various other properties of membranes produced by the procedures of the foregoing examples have been determined. To measure gel water content of such membranes, 1.5″ samples of the membrane under test were equilibrated in 0.1 N KCl solution (to place the membrane samples in the "standard" state), washed for two hours with repeated charges of distilled water to remove electrolyte, and blotted quickly with filter paper to remove surface moisture. The samples were then immediately placed in a closed weighing bottle and the system weighed to the nearest milligram. Following this the water was removed by heating the sample in vacuo at 60° C. for 24 hours; the system was then reweighed and the water content calculated in percent based on weight of the dry membrane. Measured values of gel water content of these membranes were as follows:

| Type | | Water content (percent) |
|---|---|---|
| Matrix | Ion exchange resin | |
| Polyethylene | Cation | 17.7 (avg. of 4 samples). |
| Vinyl | do | 19.6 (avg. of 6 samples). |
| Polyethylene | Anion | 14.9 (avg. of 6 samples). |
| Vinyl | do | 21.0 (avg. of 6 samples). |

The exchange capacity of these membranes—a measure of the number of active sites (counter ions) per unit weight of dry membrane, expressed as milliequivalents per gram of dry membrane—was determined by placing the membrane in a "given state of exchange" and then ascertaining, as by titration, the quantity of ions displaced from that state. Transitions from one ionic state to another usually require approximately 24 hours with a large excess of displacing ions. Results with typical membranes prepared as above are indicated in the following table:

| Type | | Exchange capacity (meq./gram) |
|---|---|---|
| Matrix | Resin | |
| Polyethylene | Cation | 1.060 (avg. of 4 samples). |
| Vinyl | do | 0.860 (avg. of 5 samples). |
| Polyethylene | Anion | 0.227 (avg. of 6 samples). |
| Vinyl | do | 0.229 (avg. of 6 samples). |

The effective composition of a permselevtice membrane, i.e., the proportionate content of resin available for exchange, can be calculated from the measured exchange capacity of the membrane and the known exchange capacity of the pure resin. In this manner, the effective composition of typical cation-permselective membranes prepared in accordance with the present invention, and incorporating cation resin having an exchange capacity of 4.6 meq. per gram of dry resin, was determined. Results are indicated in the following table, which also indicates the proportionate content of cation resin in the fluidized beds from which the membranes were prepared:

| Matrix | Cation membrane effective composition (percent cation-exchange resin) | Bed composition (percent cation exchange resin) |
|---|---|---|
| Polyethylene | 23.0 | 25.0 |
| Vinyl | 18.6 | 20.0 |

As the table indicates, the effective ion-exchange resin content of the present membranes approaches the actual resin content of the beds from which they are prepared. A loss or encapsulation of about 2% of the resin is found in the case of both polyethylene matrix and vinyl matrix membranes.

EXAMPLE VI

A reinforced anion permselective membrane was prepared in accordance with the present invention, utilizing as a mandrel a 40 mesh brass wire screen 20.6 mils thick shaped in tubular form. The membrane was produced by preheating the screen, and immersing it in a fluidized bed containing 56% VCB-1325-clear-2084 vinyl, 24% PCA-32-black-1 polyethylene, and 20% XE-67 anion exchange resin, with successive coating and heat-curing steps to build up a plurality of coats until the screen was completely coated, both internally and externally, and all screen apertures were fully closed by the membrane material. After the final curing step the membrane was boiled for an hour; in this example, of course, the membrane was not separated from the mandrel, which served as a permanent reinforcing structure for the membrane. Measurements of electrical conductivity of the membrane before and after boiling, are indicated in the following table:

| | Cell constant (ohms) | Total resistance (ohms) | Membrane resistance (ohms) | Thickness (mils) | Conductivity (mho cm.$^{-1}$) |
|---|---|---|---|---|---|
| Unboiled | 131.4 | 604.2 | 457.8 | 72.5 | $0.31 \times 10^{-3}$ |
| Boiled | 131.2 | 280.3 | 149.1 | 73.0 | $0.98 \times 10^{-3}$ |

It will be noted that the boiling step produced a significant improvement in membrane conductivity, notwithstanding that since the membrane was not separated from the mandrel, there was no exposed fused inner surface as developed on the membranes of Examples I through V above.

EXAMPLE VII

A cation permselective reinforced membrane was prepared using as the membrane support and mandrel a 4" x 6" 14 mesh stainless steel screen having a wire diameter of 17 mils. The screen was preheated for 10 minutes at an oven temperature of 500° F., and immersed in a fluidized bed having a height of 8" and containing one part XE-69 cation exchange resin powder to three parts PCA-32-black-1 polyethylene powder. Immersion time was three seconds, followed by a one minute curing period in the oven. The immersions were repeated, under the same conditions, with a curing period following each immersion, to produce a total of six coats on the screen. Following the final curing step, the produced membrane was air-cooled for one minute, and boiled for two minutes.

EXAMPLE VIII

A further cation permselective reinforced membrane was prepared by coating a 6" x 3" perforate brass metal sheet which was 10 mils thick and had round holes $\frac{1}{16}$" in diameter covering about 70% of the area of the sheet. Before application of the ion exchange-matrix mixture, the sheet was coated in a separate fluidization tank with two coats of pure polyethylene to protect the metal against electrochemical or chemical reaction in electrodialysis operations. For this preliminary coating step, the sheet was preheated in an oven at 500° F., immersed for five seconds in a fluidized bed of polyethylene powder, cured for 30 seconds in the oven, and again immersed for five seconds in the polyethylene fluidized bed after which it was once more cured for 30 seconds. Then the precoated metal sheet, heated in the oven at 500° F., was immersed in a fluidized bed containing one part XE-69 cation exchange resin powder to three parts PCA-32-black-1 polyethylene powder. Four coats of this mixture were applied to the sheet with an immersion time of five seconds for each coat and a curing time (in the oven) of 30 seconds between successive immersions. After the final immersion the membrane was cured in the oven for 75 seconds.

The electrical conductivity of this membrane in 0.1 N KCl was determined to be $0.89 \times 10^{-3}$ mho cm.$^{-1}$. Membrane permselectivity, as measured by interposing the membrane between a 1.0 N KCl solution and an 0.5 N KCl solution, was 81.1%. The wet thickness of the membrane was 60 mils.

EXAMPLE IX

An anion permselective membrane was prepared on a five mil thick brass metal sheet having $\frac{1}{16}$" diameter round perforations occupying about 70% of the sheet area. This sheet was first immersed in water containing 1% Nacconol surfactant to effect uniform wetting of the sheet surface. Thereafter, the wetted sheet was immersed in a fluidized bed containing 20% XE-67 anion exchange resin and 80% polyvinyl chloride powder. The coated screen was then cured for about one minute in an oven at 400° C., and two further coats from the fluidized bed were applied by successive immersions, each followed by curing; in the case of these latter immersions, wetting of the surface was not necessary to secure adhesion of the particles since the patrial fusion of earlier coats provided an adherent surface for the particles. In this manner a non-perforate reinforced membrane 42 mils thick was obtained. After the membrane was boiled for one hour in water and equilibrated in 0.1 N KCl for 24 hours the electrical conductivity (in 0.1 N KCl) was found to be $0.43 \times 10^{-3}$ mho cm.$^{-1}$ and the transfer number of the membrane (measured by interposing it between an 0.1 N KCl solution and an 0.5 N KCl solution) was 95%.

EXAMPLE X

A 16 mesh screen of glass fiber coated with anodized aluminum, 11.3 mils in thickness, was wrapped around a 3 inch diameter brass tubular mandrel having a wall thickness of 0.049 inch and provided with a Thermowell thermocouple welded to the inside wall of the mandrel. The screen-bearing mandrel was preheated to a wall temperature of 480° F. and immersed in a fluidized bed containing 25% XE-69 cation exchange resin powder and 75% black polyethylene powder. After a five second immersion, the structure was cured for 3½ minutes at an oven temperature of 475° F., reimmersed in the fluidized bed for five seconds, and cured for four minutes at 475° F. The resultant structure was a very strong and mechanically stable cation-permselective membrane.

It was found, however, that this membrane was difficult to release from the mandrel even after prolonged boiling and soaking in water, because of the high dimensional stability provided by the glass fiber screen supporting the membrane, this screen acting to prevent radial expansion (swelling) of the membrane.

EXAMPLE XI

An anodized aluminum coated glass fiber screen as used in Example X was wrapped around a metallic mandrel so that the edges of the screen overlapped. The anodized aluminum coat was then burned, with the result that a "green glass" tube formed having the edges of the glass screen welded together to provide a tubular glass element having substantial dimensional stability. This glass tube was then used as a supporting mandrel to produce a reinforced cation-permselective tubular membrane. After the tubular glass screen was sprayed with mineral oil to provide a wetted surface for adherence of the particles, it was immersed in a fluidized bed containing one part XE-69 cation-exchange resin powder and three parts PCA-32-black-1 polyethylene powder, for five seconds. This was followed by a one-minute curing step in an oven at 500° F. Five more coats were applied under identical conditions with a one-minute curing at 500° F., after each immersion, but further wetting of the screen was not necessary as the already applied coats provided an adherent surface for the particles. Thickness of the produced membrane was 41 mils. The conductivity of the membrane (in 0.1 N KCl) was $0.58 \times 10^{-3}$ mho. cm.$^{-1}$ and its permselectivity (measured with the membrane interposed between a 1.0 N KCl solution and an 0.5 N KCl solution) was 87.5%.

EXAMPLE XII

An open-mesh conductive electrodialysis separator was prepared in accordance with the present invention by coating a wire screen with a mixture of matrix particles and ion-exchange resin particles so as to completely coat the wire of the screen while leaving the openings of the screen free for passage of liquid. In this example, the screen used was a 5" x 11" piece of 304 stainless steel screen, this being an 8 mesh screen with a wire thickness of 18 mils. After preheating, the screen was immersed in a fluidized bed containing 375 grams of XE-69 cation-exchange resin powder, 375 grams of XE-67 anion-exchange resin powder, and 2,250 grams of PCA-32-black-1 polyethylene powder, the ratio of resin to matrix in the bed being 1 to 3, and the bed height being 13". Four coats of this mixture were applied to the screen with an immersion time of 3 second for each coat. After the first immersion, the screen was cured for one minute at an oven temperature of 400° F. After each of the succeeding immersions, the screen was cured for 1¼ minute at the same oven temperature. The final curing step was followed by air cooling for one minute, and a two-minute water quenching at a water temperature of 100° C.

In the produced separator, the wire of the screen was completely covered by the resin-matrix mixture and all screen holes weere free for passage of liquid. Owing to the use of both cation- and anion-exchange resins in the fluidized bed, the coating was bipolar in character. Similar screens which are either cationic or anionic in character may be produced by like procedure utilizing only one charge type resin in the bed.

EXAMPLE XIII

A cation-permselective membrane prepared in accordance with the present invention from a fluidized bed containing 25% XE-69 cation-exchange resin powder and 75% PCA-32-black-1 polyethylene powder, but not boiled, was immersed for a period of months in an 0.1 N KCl aqueous solution at room temperature (about 70° F.). The protracted immersion was found to effect significant improvement in membrane conductivity, as indicated by the conductivity measurements set forth in the following table.

| Duration of immersion (months): | Conductivity (mho cm.$^{-1}$) |
|---|---|
| 0 | 0.00 |
| 1 | $0.32 \times 10^{-4}$ |
| 8 | $0.46 \times 10^{-4}$ |
| 9 | $0.46 \times 10^{-4}$ |

EXAMPLE XIV

An anion- permselective tubular membrane prepared in accordance with the present invention from a fluidized bed containing 20% XE-67 anion-exchange resin powder and 80% "Microthene" white micropowder polyethylene (a low molecular weight polyethylene manufactured by V.S.I. Chemicals), but not boiled, was immersed in water at about 80° C. for about 30 minutes to improve its conductivity. This water temperature was used because the matrix material softens excessively at 100° C. Results are indicated in the following table, wherein conductivity values are given as measured in 0.1 N KCl aqueous solution:

| | Conductivity (mho cm.$^{-1}$) |
|---|---|
| Before treatment | $0.15 \times 10^{-3}$ |
| After water immersion | $0.91 \times 10^{-3}$ |

In further illustration of the advantageous properties of the present invention with respect to attainment of high membrane conductivity in ion exchange membranes having low proportions of ion exchange material, reference may be had to the following table which compares the conductivity of representative commercially available heterogeneous permselective membranes containing 50 percent ion-exchange resin, with exemplary permselective membranes of the present invention prepared by the method thereof.

| Type | Resin in Matrix (percent) | Matrix | Conductivity×10³ (mhos/cm.) | Thickness (mils) |
|---|---|---|---|---|
| COMMERCIALLY AVAILABLE MEMBRANES | | | | |
| Cation | 50 | Methacrylate | 1.97 | 7 |
| Anion | 50 | do | 0.46 | 7 |
| MEMBRANES OF PRESENT INVENTION | | | | |
| Cation | 20 | Vinyl | 1.60 | 20 |
| Do | 20 | do | 1.50 | 30 |
| Do | 20 | do | 1.30 | 40 |
| Do | 25 | Black Polyethylene | 0.83 | 44 |
| Do | 20 | White Polyethylene | 2.52 | 82 |
| Anion | 20 | Black Polyethylene and Vinyl | 0.97 | 40 |
| Do | 20 | Vinyl | 0.53 | 40 |
| Do | 20 | White Polyethylene | 0.91 | 47 |

We claim:

1. A method of making an ion-permeable membrane, comprising establishing and maintaining a fluidized bed of a mixture of particles of thermoplastic polymeric material and particles of infusible ion-exchange resin, said mixture containing between about 15% and about 30% by weight ion-exchange resin particles, said thermoplastic polymeric material having a second order transition temperature below the boiling point of water; immersing at least once in said fluidized bed a mandrel having a surface to which said particles are capable of adhering, to establish on said surface a layer of said mixture of particles; heating said mandrel after each immersion in said fluidized bed to effect partial fusion of said thermoplastic polymeric material in said layer thereby to constitute said layer as a membrane; and immersing said membrane in water at a temperature above the second order transition temperature of said thermoplastic polymeric material for at least about one-half hour for enhancing the conductivity of said membrane.

2. A method according to claim 1 wherein said thermoplastic polymeric material is selected from the class consisting of polyethylene, polypropylene, and polyvinylchloride.

3. A method according to claim 1 wherein said mandrel is repeatedly immersed in said fluidized bed and is heated as aforesaid after each immersion to build up a membrane constituted of a succession of deposited layers of said mixture of particles.

4. A method according to claim 1, including the intermediate step of immersing said mandrel bearing said membrane in water for effecting release of said membrane from said mandrel by swelling of said membrane just prior to the aforementioned step of immersing said membrane in water at a temperature above the second order transition temperature of said thermoplastic polymeric material.

5. A method according to claim 1, wherein said mandrel is a perforate mandrel to which said particles are capable of adhering.

6. A method according to claim 5, wherein said perforate mandrel is a metal mandrel.

7. A method according to claim 6, wherein said perforate metal mandrel is coated with a protective layer of inert material prior to the first immersion of said mandrel in said fluidized bed.

8. A method according to claim 5, wherein the duration and number of immersions of said perforate mandrel in said fluidized bed are selected to effect coating of the solid portions of said mandrel leaving the perforations of said mandrel open for passage of liquid therethrough.

9. A method according to claim 1, wherein said mandrel has an outer surface of tubular configuration to which said particles are capable of adhering.

10. A method according to claim 9, wherein said mandrel is heated before the first immersion of said mandrel in said fluidized bed, to a temperature at which said thermoplastic polymeric material particles sinter, and including the intermediate step of immersing said mandrel bearing said membrane in water for effecting release of said membrane from said mandrel as a seamless tubular membrane by swelling of said membrane just prior to the aforementioned step of immersing said membrane in water at a temperature above the second order transition temperature of said thermoplastic polymeric material.

11. A method according to claim 1, wherein said ion-exchange resin consists of resin of a single predetermined charge type.

References Cited

UNITED STATES PATENTS

| | | |
|---|---|---|
| 2,844,489 | 7/1958 | Gemmer. |
| 2,957,206 | 10/1960 | Mindick et al. _____ 264—53 X |
| 3,002,231 | 10/1961 | Walker et al. |
| 3,297,595 | 1/1967 | Mindick et al. _____ 204—296 |

FOREIGN PATENTS 1,359,843  1964  France.

ROBERT F. WHITE, *Primary Examiner.*

K. J. HOVET, *Assistant Examiner.*

U.S. Cl. X.R.

117—21; 264—121, 122, 126, 296, 343